C. E. BONINE.
ELECTRIC LIGHTING AND ENGINE STARTING SYSTEM.
APPLICATION FILED JULY 7, 1911.
1,023,122. Patented Apr. 16, 1912.
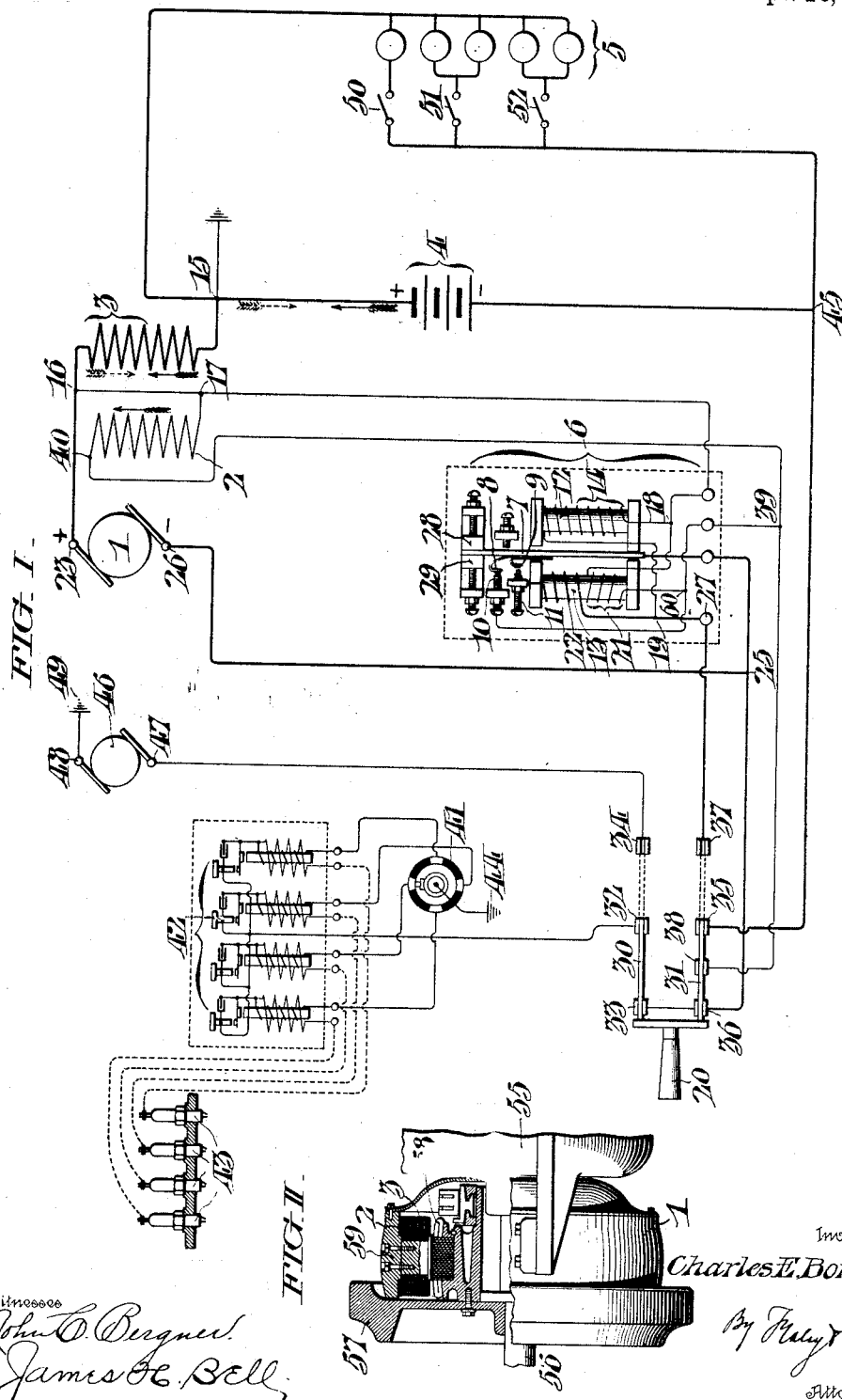

UNITED STATES PATENT OFFICE.

CHARLES E. BONINE, OF PHILADELPHIA, PENNSYLVANIA.

ELECTRIC LIGHTING AND ENGINE-STARTING SYSTEM.

1,023,122.  Specification of Letters Patent.  Patented Apr. 16, 1912.

Application filed July 7, 1911. Serial No. 637,334.

*To all whom it may concern:*

Be it known that I, CHARLES E. BONINE, of Philadelphia, in the county of Philadelphia and State of Pennsylvania, have invented certain new and useful Improvements in Electric Lighting and Engine-Starting Systems, whereof the following is a specification, reference being had to the accompanying drawings.

The invention relates to a system of electric light, heat and power supply, in which a storage or secondary battery is used, together with a suitable electric machine, and an engine for driving the electric machine when the same is used as a generator.

An object of the invention is to provide means for increasing the torque of the electric machine when said electric machine is used as a motor for starting the engine; also means for automatically connecting the battery to the electric machine when the same is running as a generator and the battery charge is low, means for automatically preventing the connection of the battery to the electric machine when the same is being driven by the engine and the battery charge is high, means for automatically disconnecting the charging electric machine from the battery when the voltage of the electric machine falls below the voltage of the battery, and means for automatically limiting the maximum value of the charging current flowing from the electric machine to the battery.

The preferred application of the invention is in connection with an automobile of the internal combustion engine driven type, wherein it is desired to operate an electric machine for charging a battery which may be used for lighting a series of lamps or for other purposes, and which battery may also be used for operating the electric machine for cranking the engine.

In the drawings which show by way of illustration, one embodiment of the invention, Figure I, is a diagrammatic view, showing my improved system as applied to the electric lighting of an automobile, and the starting of the engine. Fig. II, is a detail, partly in section, of an electric machine which may be used in connection with my improved system.

The invention consists generally of an electric machine 1, which is provided with a shunt field winding 2, and a series field winding 3. A storage or secondary battery 4, may be of any desired construction, and is so connected with the electric machine that the battery may be charged from the electric machine when the same is operated as a generator, and that the battery may operate the electric machine as a motor to start the engine when desired. A series of lamps or other load 5, is in circuit with the battery and the generator so that the lamps may be operated either from the battery or the generator. In order to control the charging of the battery for varying speeds of the generator, (for preventing the generator being connected to the battery when the same is at full charge), and for disconnecting the generator when the voltage of the generator is less than that of the battery, I have provided an automatic switch or relay 6, which is controlled by the voltage of the battery, and the voltage of the generator. This automatic switch which will be hereinafter described more fully, forms however, *per se*, no part of the present invention as the same is shown, described and claimed in my co-pending application Serial No. 591,296, filed November 8th, 1910. In order that the electric machine may be operated as a generator for charging the battery or as a motor for starting the engine, I have provided a manually controlled switch 20, which may be used to cut out the automatic switch and connect the battery direct to the electric machine.

Referring more in detail to the system illustrated diagrammatically in Fig. I, the automatic switch 6, consists of a single movable armature 7, carrying two independent contact springs 8 and 9, which are adapted to coöperate with two corresponding independently adjustable contact screws 10, and 11, mounted on the base of the switch. The spring 8, and contact screw 10, form contact points for controlling the shunt field circuit of the electric machine and the circuit of the coil 21, of the automatic switch while the spring 9, and the contact screw 11, form contact points for controlling the series circuit. The armature 7, is acted upon by two magnets 12, and 13, placed one on each side of the armature. The magnet 12, is wound with a high resistance coil 14, which coil is connected across the battery terminals through the circuit 15, 16, 17, 18, 19, 27, 37, switch blade 31, 35, 45. The strength of the magnet 12, will therefore vary with the voltage of the battery 4. The magnet 13, is wound with two coils 21, and 22. The coil 21, is of high resistance and is connected across the armature of the electric machine through the circuit 23, 16, 18, 60, 10, 8, 25, 26, and the current flowing in this circuit will vary approximately with the voltage of the armature of the electric machine. The coil 22, consists of a few turns of comparatively large size wire, and the main current from the electric machine to the battery flows through it in the circuit 23, 16, 15, 45, 35, switch blade 31, 37, 27, 11, 9, 25, 26. The coils 21, and 22, are wound in such direction that their magnetizing action on the magnet 13, are added together when current flows from the electric machine to the battery, but when current flows from the battery to the electric machine, through the automatic switch, the magnetizing action of the coil 22, is in opposition to that of the coil 21. Springs 28, and 29, press upon opposite sides of the armature 7, which springs, and the stops coöperating with the armature, are more clearly shown and described in my co-pending application.

The manually controlled switch 20, consists of knife blade contacts 30 and 31. The contact blade 30, connects the terminal 32, with either the terminal 33, or the terminal 34, while the contact blade 31, connects the terminal 35, to either the terminal 36, or the terminal 37. The terminal 37, is connected with one side of the armature of the electric machine through the automatic switch, while the terminal 36, is connected directly with one side of the armature of the electric machine. The terminal 35, is connected directly with one side of the battery. Between the terminals 35, and 36, is a terminal 38, which connects with the knife blade contact 31, and through the circuit 39, 40, is connected with the shunt field of the electric machine.

A timer 41, is connected with the spark coils 42, which in turn are properly connected with the spark plugs 43. The timer 41, is grounded at 44. The ignition system receives current from the battery through the circuit 15, the ground connection 44, to the timer and spark coils, and thence to the terminal 32, switch blade 30, the terminals 33, and 36, switch blade 31, 35, 45. This is of course, when the manual switch is in the position shown in full lines in Fig. I. When the manual switch is thrown so as to connect with the terminals 34, and 37, then the battery will be cut off from the ignition system. When the manual switch is in the position shown in full lines in said figure, the battery is also connected to the armature of the electric machine and the series field windings 3, of the electric machine, through the circuit 15, 16, 23, 26, 25, 36, switch blade 31, 35, 45. The shunt field 2, of the electric machine is connected to the battery through the circuit 15, 16, 17, 40, 39, 38, switch blade 31, 35, 45. When the switch 20, is thrown to the position indicated in dotted lines, the ignition system connection to the battery is interrupted, and also the armature and field winding connection with the battery and the connection between the electric machine and battery can be made only by the operation of the automatic switch 6. The connection between the magneto 46, or other independent source of ignition energy is established through the circuit 47, 34, switch blade 30, 32, spark coils 42, and timer 41, to the ground connection 44, the other terminal 48, of the magneto being connected to a ground connection 49.

The operation of the system is as follows: Considering that the automobile engine is not running and that the mechanically operated switch is in the position shown in solid lines in Fig. I, at this time a current will flow from the battery 4, through the circuit 15, 16, 23, 26, 25, 36, switch blade 31, 35, 45, in a direction shown by the solid arrow. The shunt field winding 2, will receive current from the battery 4, through the circuit 15, 16, 17, 40, 39, 38, switch blade 31, 35, 45, also in a direction shown by solid arrows. It will be seen that the series field windings 3, and the shunt field windings 2, are acting in the same direction, and their combined effect will be to establish a very powerful magnetic field through the electric machine armature, thereby increasing the torque of the electric machine which is now operating as a motor. The armature of the electric machine is connected to the engine shaft either by a chain or tooth gearing, direct coupling or through a friction clutch, so that when the armature of the electric machine is turned, the engine shaft will be likewise turned. When, therefore, the electric machine is driven as a motor from the battery, the engine shaft will be turned, thus starting the engine. The ignition apparatus of the engine is at this time connected to the battery through the mechanically controlled switch as above noted, and, therefore, the charges in the engine cylinders will be fired, upon the turning of the engine shaft through the operation of the electric machine, which will of course, at this time also operate the timer. As soon as the engine is started the manually controlled switch may be thrown to the position indicated in dotted lines, which will connect the ignition system to the magneto, cutting out the connection thereof with the battery, and which will also connect the electric machine with the battery through the automatic switch 6, after which the automatic switch 6, serves to control the electric machine which will now be driven by the engine, and will operate as a generator to charge the battery.

It will be noted that the failure to throw the manually controlled switch from engine-starting position to regular running position at the proper time, will not be productive of any ill effect to either the electric machine or the battery, for under these conditions the electric machine operating as a generator will deliver current to the battery through the circuit 23, 16, 15, 45, 35, switch blade 31, 36, 25, 26. The current it will be noted, flows in the direction indicated by the dotted arrows and therefore, the direction of current through the series field windings has been reversed and the self-regulating feature of the machine comes into play to limit the current to the safe charging current of the battery for which the generator was designed. During such abnormal operation of the generator, the automatic switch 6, has been cut out of action, but upon throwing the mechanically controlled switch into the running position indicated by dotted lines in Fig. I, the automatic switch is placed in control, and the charging of the battery will be continued, if of course the battery voltage be low enough to demand charging.

During all of the foregoing operations, the load or laps 5, can be connected across the battery by closing the switches 50, 51, and 52, current being sent through the circuit 15, switches 50, 51, 52, 45. It will be understood therefore, that the energy supplied to the lamps or load 5, is entirely independent of the operation of the engine, the electric machine, the automatic switch or the manually controlled switch.

The manner of controlling the charge of the battery from the electric machine by the automatic switch is briefly as follows: If the battery 4, loses some of its charge so that its voltage has reached a correspondingly low point, the armature 7, of the automatic switch will be in the position with the contacts 8, and 10, closed. This closes merely the circuit from the armature through the shunt windings of the electric machine and the circuit of the coil 21, of the automatic switch. Upon the building up of the voltage of the electric machine, the coil 21, will create a magnetic pull on the armature 7 against the adjustable spring 29, and close the contacts 9, and 11, which places the battery in circuit with the armature of the electric machine. The coils 21, and 22, will now act together to hold the main circuit closed. If the speed of the electric machine should drop so that the voltage generated is below that of the battery, then the strength of the magnet 13, will weaken the spring 29, will throw the armature 7, so as to separate the contacts 9, and 11. This opens only the series circuit; the contacts 8, and 10, cannot open until after the series circuit has opened, and therefore the shunt circuit can be only opened when a relatively low voltage is being impressed on this circuit by the armature of the electric machine. When the contacts are separated, breaking both the series and the shunt circuits the magnet 12, acting upon the armature 7, and energized by the voltage of the battery will hold these contacts open until the voltage of the battery becomes weakened, so that the spring 28, may reëstablish the contacts 8, and 10. The value of the charging current flowing from the electric machine to the battery is controlled entirely by the design of the windings of the electric machine, the current flowing through the series circuit weakening the field of the generator and reducing the effective generated voltage and thereby limiting the value of the current in a manner well understood.

While the invention is especially adapted for use in connection with internal combustion engines as applied to an automobile, it will be evident that it may be used for other purposes. When however, applied to an engine of the above character, the shaft 56 carrying the armature of the electric machine, is connected in any suitable way with the shaft of the internal combustion engine. Said shaft carries a balance wheel 57, and an armature 58, which is provided with the usual winding. The field 59, of the electric machine is provided with a shunt winding 2, and a series winding 3, as illustrated in the diagrammatic view. It is not thought necessary to go into the details of the electric machine, as the electric machine *per se*, forms no part of the present invention.

It will be obvious that the system herein described may be used for other purposes than for starting the engine of an automobile, and operating the lighting system thereof. It will also be obvious that minor changes in the details of construction may be made, without departing from the spirit of the invention, as set forth in the appended claims.

Having thus described my invention, I claim:

1. The combination of an engine; an electric machine connected thereto; a secondary battery; an automatic switch for controlling the charge of the battery by the electric machine; and a manually-operated switch for cutting out the automatic switch and connecting the battery to the electric machine, whereby the same may be operated as a motor for starting the engine.

2. The combination of an engine; a shunt and series wound electric machine connected thereto, a secondary battery in the series circuit, lamps or loads connected in multiple with said battery; an automatic switch for controlling the charge of the battery by the electric machine; and a manually operated switch for cutting out the automatic switch and connecting the battery to the electric machine, whereby the same may be operated as a motor for starting the engine.

3. The combination of an engine, a shunt and series wound electric machine connected thereto; a secondary battery in the series circuit, lamps or loads connected in multiple with said battery; said series circuit being opposed to the shunt circuit so as to limit the charging current when the engine is driving the electric machine at high speed; and said series circuit operating in conjunction with the shunt circuit to increase the torque of the electric machine when the same is operating as a motor; an automatic switch for controlling the charge of the battery by the electric machine; and a manually operated switch for cutting out the automatic switch and connecting the battery to the electric machine, whereby the same may be operated as a motor for starting the engine.

In testimony whereof, I have hereunto signed my name at Philadelphia, Pennsylvania, this sixth day of July, 1911.

CHARLES E. BONINE.

Witnesses:
JAMES H. BELL,
E. L. FULLERTON.